Nov. 11, 1969 KATSURO NAKAMURA ET AL 3,478,337
WOVEN-TYPE, FIXED MEMORY
Filed Aug. 29, 1966
FIG. 1
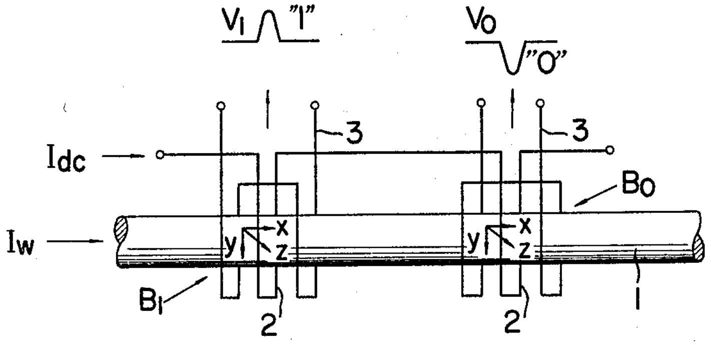
FIG. 2
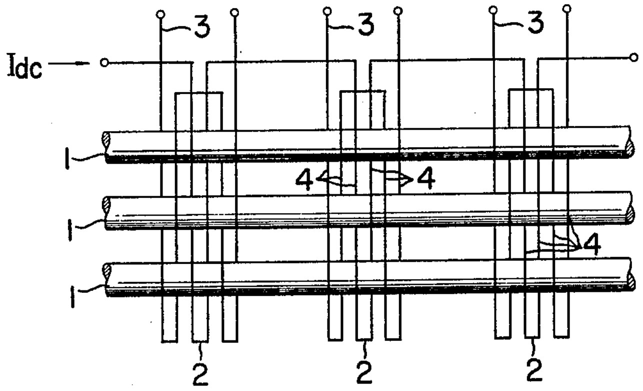
FIG. 3
| | | |
|---|---|---|
| 0 | 0 | 1 |
| 1 | 0 | 1 |
| 1 | 1 | 1 |
INVENTORS
KATSURO NAKAMURA
BY SHIGETOSHI WATANABE
H. Edward Mestern 3,478,337

WOVEN-TYPE, FIXED MEMORY

Katsuro Nakamura and Shigetoshi Watanabe, Tokyo-to, Japan, assignors to Toko Kabushiki Kaisha, Tokyo-to, Japan, a joint-stock company of Japan Filed Aug. 29, 1966, Ser. No. 575,893
Claims priority, application Japan, Sept. 1, 1965, 40/53,779
Int. Cl. G11b 5/00
U.S. Cl. 340—174 2 Claims

ABSTRACT OF THE DISCLOSURE

A fixed memory device of the woven type has a large number of magnetic weft word drive line wires crossing conductor warp wires; memory points are formed along each magnetic wire; the warp members consist of direct current bias lines wound around the memory points and connected to a bias current source, and output lines are wound around the memory points in the vicinity of the direct current bias lines, the winding directions of the direct bias lines are made to be of one type with respect to the axial direction of the magnetic wires, while the winding directions of the output lines are being made to be of another type with respect to the axial direction of the magnetic wires.

This invention relates to fixed memories of the woven type wherein a large number of magnetic wires and a large number of output lines in crossed relationship thereto are interwoven, and the information content at each memory point thereof is fixed.

Heretofore, there has been proposed, as a woven-type, fixed memory of this kind, a memory of single-polarity character in which all of the memory points are divided into those at which output is produced and those at which output is not produced. In a memory of this character, however, in cases where adverse effects such as that of noise are present, the output waveform of the information "1" and that of the information "0" become indistinguishable, whereby the possibility of misreading arises.

It is an object of the present invention to provide a fixed memory of new woven type whereby information content in the form of binary digits "1" or "0" can be readily and clearly distinguished, whereby the possibility of misreading is almost completely eliminated.

Another object of the invention is to provide a fixed memory of the above stated character having a simple construction and arrangement and simple operation.

The term "magnetic wire" is used herein to designate, in addition to an ordinary magnetic wire, any of other wires such as magnetic thin film wire consisting of a conductor core wire coated with a magnetic thin film and clad wire consisting of a conductor wire covered with a magnetic coating.

According to the present invention, briefly stated, there is provided, in a fixed memory of the woven type wherein a large number of magnetic wires constituting word drive lines are woven as weft members with a large number of conductor wires as warp members across the magnetic wires to form a fabric structure having a plurality of memory points along each magnetic wire, a number of D-C bias lines for imparting, when a direct current is passed therethrough, a bias magnetic field in the magnetic wire axial direction at each memory point, each D-C bias line being formed from a number of warp-member conductor wires, and a number of output lines each formed from a number of other warp-member conductor wires in the vicinity of a D-C bias line, the warp-member conductor wires being characterized by a connection and weaving arrangement whereby the memory points are differentiated as memory points at each of which the direction of the output line is the same as that of the direct current passed through the D-C bias line with respect to the magnetic wire and as memory points at each of which the direction of the output line is opposite that of the direct current.

The nature, principle, and details of the invention will be more clearly apparent from the following detailed description with respect to a preferred embodiment of the invention when read in conjunction with the accompanying drawing, in which like parts are designated by like reference numerals.

In the drawings:

FIGURE 1 is an enlarged, diagrammatic view indicating the principle of the fixed memory according to the invention;

FIGURE 2 is an enlarged, diagrammatic view showing one example of a fixed memory embodying the invention; and FIGURE 3 is a tabular representation indicating the information contents at the various memory points in the example shown in FIGURE 2.

FIGURE 1 shows two memory points $B_1$ and $B_0$ of different arrangement of the fixed memory according to the invention. The memory points are formed at points on each magnetic wire 1 crossed by a D-C bias line 2 and output lines 3. While the D-C bias line 2 is under exactly the same condition with respect to each of the memory points $B_1$ and $B_0$, the direction of the output line 3 is different at the two memory points. That is, while the output line 3 passing through the point $B_1$ has a direction with respect to the magnetic wire 1 which is coincident with that of the direct current $I_{dc}$ flowing through the D-C bias line 2, the output line 3 at point $B_0$ has a direction with respect to the magnetic wire 1 which is opposite that of the current $I_{dc}$.

When a direct current $I_{dc}$ is passed through the D-C bias line 2 as indicated in FIGURE 1, the magnetic fields at the memory points $B_1$ and $B_0$ are directed in the wire axial direction $x$ of the magnetic wire 1.

Then, if a word drive pulse current $I_W$ is passed through the magnetic wire 1, the directions of the magnetic fields at the memory points $B_1$ and $B_0$ will be deflected to a direction $z$ by the vector sum of a component in the $x$ direction due to the current $I_{dc}$ and a component in the $y$ direction due to the pulse current $I_W$. This deflection of the magnetic fields will cause an output to be induced in each of the two output lines 3.

However, since the output line at point $B_1$ and the output line at point $B_0$ have mutually different winding directions as described above, the output $V_1$ appearing in the output line at point $B_1$ and the output $V_0$ appearing in the output line at point $B_0$ will have polarities of mutually different signs.

Accordingly, since it is possible to read and discriminate the information content in the form of "1" or "0" depending on whether the polarity of the output is positive or whether it is negative, the memory points can be used as fixed memories of two polarities.

A woven-type, fixed memory according to the invention based on the above described principle is illustrated in FIGURE 2. While only nine memory points are shown in FIGURE 2 as being formed by three magnetic wires 1 and three output lines 3 in order to facilitate understanding of the invention, the number of magnetic wires and the number of output lines are both large in actual practice and may be as high as several thousands or several tens of thousands.

Furthermore, while the output lines 3 are shown in FIGURE 2 as being substantially separated for the sake of clarity, the spaces between these output lines in actual practice are almost non-existent or are occupied by a certain number of interwoven spacer wires, whereby the entire fabric structure can be woven in a dense manner such that almost no spaces between the lines and wires are observable to the naked eye. The warp-member conductor wires 4 shown in FIGURE 2 are, of course, provided with insulating coatings.

Both the output lines 2 and the D-C bias lines 3 are formed by suitably connecting the ends of the warp member conductor wires 4 after the fabric structure has been woven. In the example illustrated in FIGURE 2, each D-C bias line 2 is provided with one coil turn formed by two warp member conductor wires, and the neighboring four warp member conductor wires are used to form an output line 3 of two coil turns. All of the D-C bias lines 2 are connected in series and connected to a common D-C power source, whereby D-C bias magnetic fields can be imparted to all memory points.

The winding directions of the output lines at the memory points are according to those of memory points $B_1$ and $B_0$ in FIGURE 1 and are differentiated in weaving as to be coincident or opposite to the direction of the direct current $I_{dc}$. If, as a supposition, the former case is made to correspond to the digit "1," and the latter case is made to correspond to the digit "0," the information contents of the nine momory points shown in FIGURE 2 will be as indicated in FIGURE 3.

While in the example illustrated in FIGURE 2 the D-C bias lines 2 are placed under constant conditions, and the output line directions are differentiated, this is a relative arrangement. Therefore, if the output lines are placed under constant conditions (woven in the ordinary manner), the direction of the D-C bias lines may be changed instead. In this case, the directions of the D-C bias magnetic fields at some of the various memory points of each magnetic wire will be rightward, while those at other memory points of the same magnetic wire will be leftward.

As described above, by the practice of the present invention, it is possible to read and distinguish clearly information content in the form of digits "1" and "0" by using two polarities, positive and negative, of the outputs of the memory points, whereby the possibility of misreading is almost completely eliminated.

It should be understood, of course, that the foregoing disclosure relates to only a preferred embodiment of the invention and that it is intended to cover all changes and modifications of the example of the invention herein chosen for the purposes of the disclosure, which do not constitute departures from the spirit and scope of the invention as set forth in the appended claims:

What we claim is:

1. In a fixed memory device of the woven type, wherein a large number of magnetic wires constituting word drive lines are woven as weft members with a large number of conductor wires as warp members crossing said magnetic wires to form a fabric structure having a plurality of memory points along each magnetic wire; said warp members consisting of direct current bias lines wound respectively around said memory points and connected to a bias current source and output lines wound respectively around said memory points in the vicinity of said direct current bias lines, the winding directions of said direct current bias lines being made to be same with respect to the axial direction of said magnetic wires, and the winding directions of said output lines being made to be different with respect to the axial direction of said magnetic wires.

2. In a fixed memory device of the woven type, wherein a large number of magnetic wires constituting word drive lines are woven as weft members with a large number of conductor wires as warp members crossing said magnetic wires to form a fabric structure having a plurality of memory points along each magnetic wire; said warp members consisting of direct current bias lines wound respectively around said memory points and connected to a bias current source and output lines wound respectively around said memory points in the vicinity of said direct current bias lines, the winding directions of said direct current bias lines being made to be different with respect to the axial direction of said magnetic wires, and the winding direction of said output lines being made to be same with respect to the axial direction of said magnetic wires.

References Cited

UNITED STATES PATENTS

| | | | |
|---|---|---|---|
| 3,069,661 | 12/1962 | Gianola | 340—174 |
| 3,223,983 | 12/1965 | Hespenheide | 340—174 |
| 3,287,708 | 11/1966 | Anderson et al. | 340—174 |
| 3,290,512 | 12/1966 | Tillman et al. | 307—88 |
| 3,295,115 | 12/1966 | Snyder | 340—174 |

STANLEY M. URYNOWICZ, Jr., Primary Examiner